Oct. 22, 1957     L. I. KELLY     2,810,252
NUT GATHERING DEVICE
Filed Feb. 16, 1956
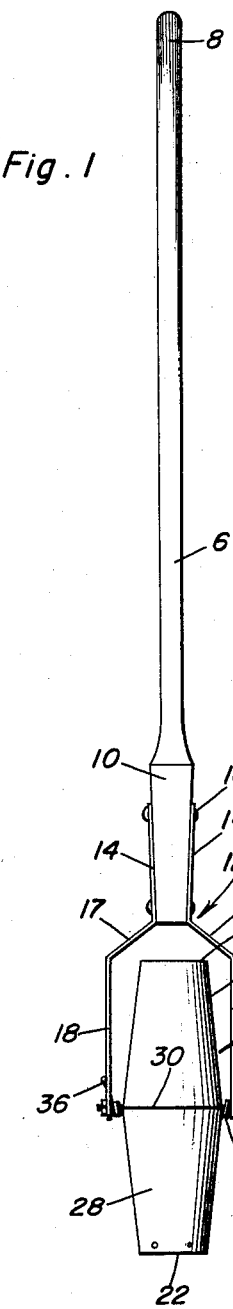
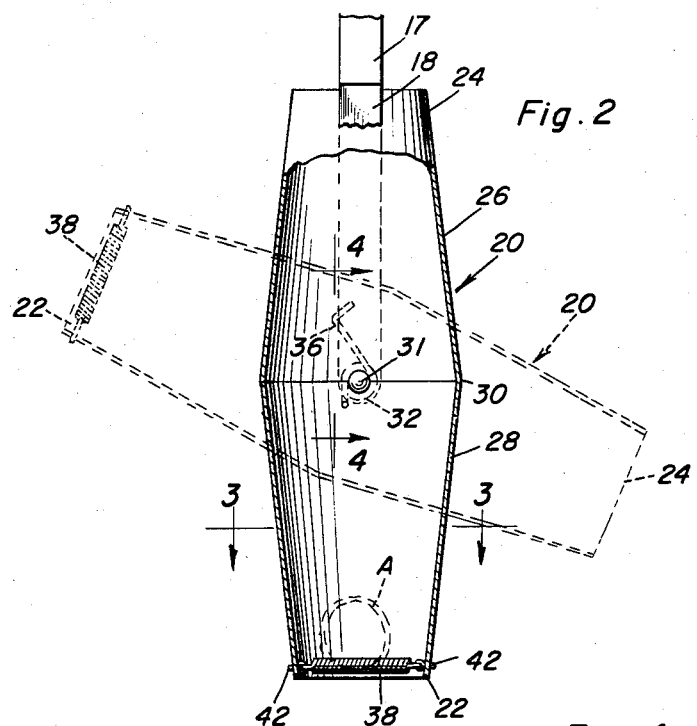
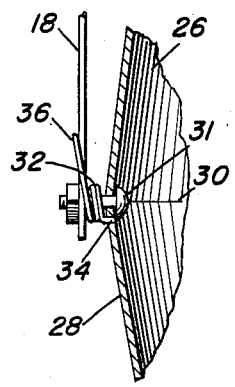
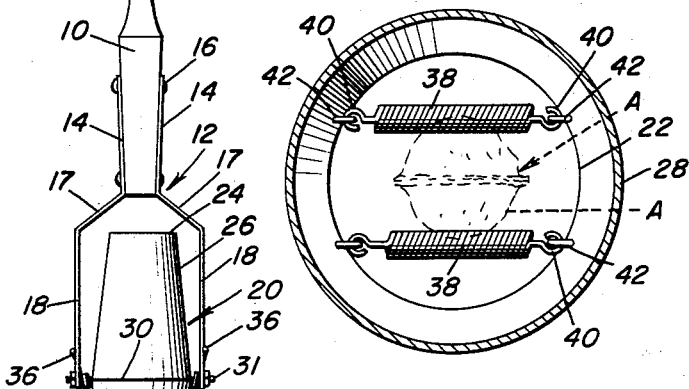
Luther I. Kelly
    INVENTOR.

United States Patent Office 2,810,252
Patented Oct. 22, 1957

2,810,252

NUT GATHERING DEVICE

Luther I. Kelly, Gulfport, Miss.

Application February 16, 1956, Serial No. 565,918

2 Claims. (Cl. 56—328)

This invention relates to a manually actuatable pickup and gathering device for nuts of ordinary size say, for example, pecans, walnuts, hickory nuts and the like, and has reference in particular to a reach pole, one end of which is fashioned into a handle or hand-grip and the other end of which is provided with a specially designed pickup and gathering head.

The obvious objective of the invention is to provide a nut picker with a simple, practical and expedient implement which is characterized by a reach pole or an elongated handle having the aforementioned specially designed and functioning pickup head which parts are structurally coordinated in a manner to permit the picker to walk conveniently from place to place and to force the nuts one by one into the head, said head having a trap at the leading end and an emptying funnel at the other end.

More specifically, novelty is predicated on a yoke mounted fixedly on one end of a reach pole or handle with a tubular open-ended head hinged between its ends by way of limbs or arms of the yoke and spring-biased into a position in axial alignment with the lengthwise axis of the handle and capable of being pivoted or swung to handily dump the nuts which have been trapped and gathered.

In carrying out a preferred embodiment of the invention, a head takes the form of an open-ended metal or equivalent tube having oppositely tapering truncated conical end portions, one serving as the emptying funnel and the other as the pickup head and the intake end of the latter being provided with a pair of spaced parallel coil springs which constitute the elements which pick up the nut and permit it to be trapped.

Objects, features and advantages in addition to those above touched upon will become more satisfactorily evident from the accompanying sheet of illustrative drawings.

In the drawings:

Figure 1 is an elevational view of a nut pickup and gathering device constructed in accordance with the principles of the invention showing the same ready to be used;

Figure 2 is an enlarged fragmentary elevational view with parts broken away and shown in section, showing the gathering head and illustrating, in phantom lines, how it may be hinged and swung to a position for easily dumping the collected nuts;

Figure 3 is an enlarged cross-section on the line 3—3 of Figure 2 looking in the direction of the arrows; and, Figure 4 is an enlarged fragmentary sectional view of the device taken along the line 4—4 of Figure 2.

The reach pole or handle which is of a length to accommodate the height of an average man is denoted by the numeral 6 and the upper end is fashioned into an appropriate handle 8. The lower end is fashioned into a shank 10 to which the yoke means 12 is connected. The yoke means is formed from a pair of metal or equivalent strap members having end portions 14 embracing and suitably fixed at 16 to the shank, having outwardly diverging intermediate portions 17 beyond the end of the shank and spaced parallel arms 18 which serve to support the sheet metal or equivalent gathering head 20. As before stated, this is an elongate cylindrical member, that is, cylindrical in cross-section from end-to-end and open at its opposite ends. The leading or lower end may be conveniently referred to by the numeral 22 and the trailing or upper end by the numeral 24. This head is preferably imperforate and rigid and is made up of a pair of oppositely tapering conical components 26 and 28, respectively, the outer ends of which may be said to be truncated cones. The basal portions 30 are joined together in alignment and the lower truncated cone 28 constitutes a trap for the nuts A and the upper end functions as a convenient emptying or discharging funnel and therefore 28 is the trap and 26 the funnel. The intermediate portion is joined by bolts or the like 31 to the end portions of the arms 18. Each bolt is surrounded by a coil spring 32 with one end anchored at 34 on the head and the other end suitably fastened as at 36 to the arm. The springs on both sides are so tensioned that they serve to maintain the head in the position shown in full lines in the drawings. It is possible, after picking up and loading the gathering trap 28 with nuts, to then swing the head to a convenient angle as shown in phantom lines in Fig. 2 so that the gathered nuts may be funneled and emptied into a sack, barrel or the like (not shown). Therefore, the truncated conical portions provide a satisfactory trap and funnel and the head as a unit is spring-biased into the operating position shown in the drawings.

The pickup and retaining elements are simple coil springs 38 which, as shown in Fig. 3, are in spaced parallelism and are stretched across the mouth 22 of the trapping cone 28. The end hooks 40 on the springs are attached to screw eyes 42 which are appropriately fastened to the head in the manner shown. By simply pressing the device down, assuming that nuts are on the ground, and pressing a nut between the springs the nut is caught and is forced up through the space between the springs and is trapped and gathered for subsequent funneling and discharge, all in a seemingly obvious nad practical manner.

It is believed that the invention will meet with the manufacturing requirements and economies of manufacturers and will also meet the needs of nut pickers and will save a great deal of time, patience and money.

Changes in shape, size, materials and rearrangement of parts may be resorted to in actual practice without departing from the spirit of the invention or scope of the claims as is understood.

What is claimed as new is as follows:

1. A nut pickup and gathering device comprising, in combination, a handle having upper and lower ends, a yoke embodying spaced arms having upper end portions secured to opposite side portions of the lower end portion of said handle, said arms projecting beyond the lower end of said handle and having their lower ends spaced from the lower end of said handle, and an open ended tubular head comprising a pair of alined conical portions, one portion constituting a trap for nuts and the other portion an emptying funnel and being alined for easy emptying purposes with said trap, one conical portion being located between the yoke arms and being straddled on diametrically opposite sides by said yoke arms, the lower ends of said yoke arms being hingedly connected to the portion of said tubular head at the juncture of said conical portions, and means cooperating with the open end of the other conical portion, said means being elastic and co-operating with said open end in a manner to retain nuts entering through said open end and which are trapped for subsequent emptying purposes.

2. The structure defined in claim 1, and wherein said means comprises a pair of coil springs stretched in spaced parallelism across the last named open end, the spacing between the springs being such that nuts which are forced into said open end by way of the space and springs are retained against displacement after having once passed through the space into said trap.

References Cited in the file of this patent

UNITED STATES PATENTS

| | | | |
|---|---|---|---|
| 67,279 | Fleckenstine | | July 30, 1867 |
| 668,308 | Finch et al. | | Feb. 19, 1901 |
| 704,848 | Minton | | July 15, 1902 |
| 1,265,410 | Wolken | | May 7, 1918 |
| 2,516,622 | George | | July 25, 1950 |
| 2,540,857 | Bagley | | Feb. 6, 1951 |
| 2,706,657 | Talley | | Apr. 19, 1955 |
| 2,736,157 | Weathersby | | Feb. 28, 1956 |